(12) United States Patent
Zhang et al.

(10) Patent No.: US 12,234,938 B2
(45) Date of Patent: Feb. 25, 2025

(54) FEMALE CONNECTOR AND CONNECTOR ASSEMBLY

(71) Applicant: A. Raymond et Cie, Grenoble (FR)

(72) Inventors: Chao Zhang, Jiangsu (CN); Bo Zhao, Jiangsu (CN)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/270,553

(22) PCT Filed: Jul. 6, 2022

(86) PCT No.: PCT/CN2022/104028
§ 371 (c)(1),
(2) Date: Jun. 30, 2023

(87) PCT Pub. No.: WO2023/280188
PCT Pub. Date: Jan. 12, 2023

(65) Prior Publication Data
US 2024/0077160 A1    Mar. 7, 2024

(30) Foreign Application Priority Data
Jul. 6, 2021   (CN) .......................... 202110761326.6

(51) Int. Cl.
*F16L 37/34*   (2006.01)
(52) U.S. Cl.
CPC ....... *F16L 37/34* (2013.01); *Y10T 137/87965* (2015.04)
(58) Field of Classification Search
CPC . F16L 37/34; F16L 37/30; F16L 37/32; F16L 37/50; F16L 29/04; Y10T 137/87965
See application file for complete search history.

(56) References Cited

U.S. PATENT DOCUMENTS

| | | | | |
|---|---|---|---|---|
| 2,319,015 A | * | 5/1943 | Speth ...................... | F16L 29/04 137/614.03 |
| 3,215,161 A | * | 11/1965 | Goodwin ................ | F16L 37/23 137/614.04 |

(Continued)

FOREIGN PATENT DOCUMENTS

| | | | | |
|---|---|---|---|---|
| CH | 318678 A | * | 1/1957 | ............ F16L 37/133 |
| CN | 208589582 U | | 3/2019 | |

(Continued)

OTHER PUBLICATIONS

International Search Report for PCT/CN2022/104028 dated Sep. 22, 2022, 5 pages.

(Continued)

*Primary Examiner* — Jessica Cahill
(74) *Attorney, Agent, or Firm* — WARNER NORCROSS + JUDD LLP

(57) ABSTRACT

A female connector includes: a housing defining a first axial direction and having an opening at a first end of the housing for insertion of a male connector, a first limiting member being provided on an outer periphery of the housing; a valve assembly arranged in the housing; a base defining a receiving passage extending along the first axial direction; a bushing sleeved outside the housing and arranged in the receiving passage to retain the housing in the receiving passage, the bushing being elastically deformable; and a mounting member fixed to an axial end of the base. The first limiting member is confined between the axial end and the mounting member, and a movement space for the first limiting member to move therein is defined between the axial end and the mounting member. A connector assembly includes the female connector.

17 Claims, 17 Drawing Sheets

(56) References Cited

U.S. PATENT DOCUMENTS

| | | | |
|---|---|---|---|
| 3,508,580 A | | 4/1970 | Snyder, Jr. |
| 3,809,122 A | * | 5/1974 | Berg ............... F16L 27/093 |
| | | | 251/149.9 |
| 4,723,797 A | * | 2/1988 | Veyrat ................ F16L 37/23 |
| | | | 285/277 |
| 5,251,668 A | * | 10/1993 | Walther ............... F16L 37/34 |
| | | | 285/306 |
| 5,791,366 A | * | 8/1998 | Lo ................... F16L 55/1007 |
| | | | 137/614.04 |
| 7,617,842 B2 | * | 11/2009 | Curello ............... F16L 37/32 |
| | | | 137/630.14 |
| 2004/0244848 A1 | * | 12/2004 | Maldavs ............. F16L 37/35 |
| | | | 137/614.04 |
| 2014/0373949 A1 | * | 12/2014 | Manzato ............ F16L 37/23 |
| | | | 137/614.04 |
| 2016/0010772 A1 | * | 1/2016 | Tiberghien ............ F28F 3/12 |
| | | | 285/24 |
| 2018/0142824 A1 | * | 5/2018 | Gennasio ............. F16L 37/36 |
| 2018/0209573 A1 | * | 7/2018 | Tiberghien ........... F16L 37/30 |
| 2022/0021052 A1 | | 1/2022 | Zhang et al. |

FOREIGN PATENT DOCUMENTS

| | | | | |
|---|---|---|---|---|
| GB | 916256 A | * | 1/1963 | ............ F16L 37/23 |
| WO | 2020135883 A1 | | 7/2020 | |

OTHER PUBLICATIONS

Machine assisted English translation of CN208589582U obtained from https://worldwide.espacenet.com/patent on Jun. 20, 2023, 18 pages.

* cited by examiner

FEMALE CONNECTOR AND CONNECTOR ASSEMBLY

CROSS-REFERENCE TO RELATED APPLICATIONS

This application is the U.S. National Stage of International Application No. PCT/CN2022/104028 filed on 6 Jul. 2022, which claims priority to and all advantages of Chinese Patent Application No. 202110761326.6 filed on 6 Jul. 2021, the content of which is incorporated herein by reference.

RELATED FIELD

The present application generally relates to a female connector and a connector assembly for establishing fluid communication between two fluid pipelines.

BACKGROUND

A connector assembly can be used to establish connection and fluid communication between two fluid pipelines in various applications.

The connector assembly generally includes a female connector and a male connector each of which is connected to a fluid pipeline. The male connector can be inserted into the female connector to establish fluid communication between the fluid pipelines. It is desirable that the connector assembly has a bidirectional cutoff function to prevent the fluid in the fluid pipelines from flowing out through the female connector and the male connector when the female connector and the male connector are disconnected. Further, it is also desirable that the female connector and the male connector can adapt to assembly tolerances in various directions when the female connector and the male connector are connected, so that the female connector and the male connector can be easily assembled and connected to each other, which is particularly advantageous for application scenarios where the female connector and the male connector are required to be connected or disconnected frequently. For example, as more and more renewable energy vehicle manufacturers choose the battery-pack swapping technique in which the male and female connectors of the connector assembly, used to establish fluid communication between a thermal management system in a battery pack and a coolant supply system in a vehicle, are required to be connected or disconnected again and again, it is desirable that the connector assembly can absorb assembly tolerances in various directions and achieve bidirectional cutoff.

However, developing a connector assembly that can achieve the above functions still faces many challenges.

SUMMARY

An object of the present application is to provide an improved female connector and a connector assembly to achieve one or more of the above functions.

According to a first aspect of the present application, a female connector is provided. The female connector includes: a housing defining a first axial direction and having an opening at a first end of the housing for insertion of a male connector, an outer periphery of the housing being provided with a first limiting member; a valve assembly arranged in the housing; a base defining a receiving passage extending along the first axial direction, the housing being partially received in the receiving passage; a bushing sleeved outside the housing and arranged in the receiving passage, the bushing being elastically deformable; and a mounting member fixed to an axial end of the base. The first limiting member is confined in the first axial direction between the axial end and the mounting member, and a movement space for the first limiting member to move therein is defined between the axial end and the mounting member.

The female connector according to the first aspect of the present application retains the housing in the base by using the elastically deformable bushing, and confines the first limiting member of the housing between the base and the mounting member in a movable manner. Such configuration can absorb assembly tolerances in various directions when the male connector is connected with the female connector, and allows the housing to rotate within the receiving passage of the base, so that the circumferential orientation of the housing can be adjusted as required, thereby allowing optimization of the layout of the fluid pipeline connected with the female connector.

According to the above technical concept, the first aspect of the present application may further include one or more of the following optional forms.

In some optional embodiments, a recess is provided at the axial end of the base to define the movement space together with the mounting member, and the recess is adjacent to and communicated with the receiving passage in the first axial direction.

In some optional embodiments, a second limiting member is provided on the outer periphery of the housing, and the first limiting member and the second limiting member are spaced apart in the first axial direction. The bushing is sleeved on a part of the housing located between the first limiting member and the second limiting member, and the bushing has a length smaller than a distance between the first limiting member and the second limiting member in the first axial direction.

In some optional embodiments, the first limiting member and the second limiting member are shaped and/or sized such that: the second limiting member can be inserted through the receiving passage, and the first limiting member is stopped outside the receiving passage.

In some optional embodiments, the bushing is made of thermoplastic elastomer or rubber material, and at least one cavity is defined in a peripheral wall of the bushing.

In some optional embodiments, the bushing has a slit extending in the first axial direction, and the housing is nested in the bushing via the slit.

In some optional embodiments, the mounting member is in the form of a plate and extends substantially perpendicular to the first axial direction.

In some optional embodiments, the opening of the housing has a guide surface for guiding the insertion of the male connector into the housing.

In some optional embodiments, the housing includes a first housing portion and a second housing portion which are assembled together. The first housing portion defines the first axial direction and the opening, and the second housing portion includes an adapter section for being connected with the fluid pipeline. The split structure of the housing allows the adapter section of various configurations to be used for the housing, thereby broadens the application range of the female connector, and further simplifies the internal structure of the female connector for installing the valve assembly and facilitates the assembly of the female connector.

In some optional embodiments, the valve assembly includes: a valve stem positioned in the housing along the first axial direction, the valve stem including a valve stem head and a valve stem base at two ends of the valve stem respectively; a sliding sleeve arranged in the first housing portion and sleeved outside the valve stem, the sliding sleeve being slidable between a first closed position and a first open position along the first axial direction; and an elastic element. Two ends of the elastic element respectively abut against the sliding sleeve and the valve stem base to bias the sliding sleeve toward the first closed position. The sliding sleeve blocks an annular gap between the first housing portion and the valve stem head to cut off a flow path of the female connector when the sliding sleeve is in the first closed position, and the flow path of the female connector is opened when the sliding sleeve is in the first open position.

In some optional embodiments, the second housing portion is coupled to the first housing portion and includes an inner stepped portion. The stem base is at least partially sandwiched between an end, away from the opening, of the first housing portion and the inner stepped portion of the second housing portion. With this design, the valve stem can be positioned in the housing in a simple way.

In some optional embodiments, the outer periphery of the sliding sleeve is provided with a limiting protrusion, and the inner periphery of the first housing portion is provided with a limiting surface. The limiting protrusion and the limiting surface are adapted to abut against each other to limit the sliding sleeve in the first closed position.

In some optional embodiments, the sliding sleeve includes a sealing member embedded in an outer periphery of the sliding sleeve for sealing contact with an inner peripheral surface of the first housing portion. The sealing member is in the form of an irregular sealing ring, and an inner periphery of the sealing member has two annular flanges arranged along the first axial direction. Each annular flange tapers inwardly in the radial direction. The irregular structure of the sealing ring can prevent the sealing ring from being separated from the sliding sleeve when the sliding sleeve reciprocates.

According to a second aspect of the present application, a connector assembly is provided. The connector assembly includes a female connector according to the first aspect of the present application and a male connector for being connected with the female connector. The male connector includes: a casing defining a second axial direction and having a plug end in the second axial direction, the plug end defining a port; and a valve unit arranged in the casing and includes a valve core and an elastic member, the valve core being movable in the second axial direction between a second closed position and a second open position, the valve core being biased toward the second closed position by the elastic member. The valve core blocks the port to cut off a flow path of the male connector when the valve core is in the second closed position, and the flow path of the male connector is opened when the valve core is in the second open position. The female connector and the male connector interact with each other when connected with each other, such that the flow path of the female connector and the flow path of the male connector are both opened and in fluid communication with each other.

According to the above technical concept, the second aspect of the present application may further include one or more of the following optional forms.

In some optional embodiments, the plug end defines a first inner peripheral inclined surface and a second inner peripheral inclined surface. An inner peripheral surface of the port, the first inner peripheral inclined surface, and the second inner peripheral inclined surface are sequentially connected in the second axial direction, and the first inner peripheral inclined surface and the second inner peripheral inclined surface are configured to guide a sealing member embedded in an outer periphery of the valve core to move in the second axial direction into sealing contact with the inner peripheral surface of the port. The first inner peripheral inclined surface and the second inner peripheral inclined surface respectively form a first angle and a second angle with respect to the second axial direction, and the first angle is smaller than the second angle. The sealing member is guided into the port along the two successively arranged inner peripheral inclined surfaces having decreasing inclination angles, so that elastic force to be provided by the elastic member can be reduced. Therefore, the service life of the elastic member can be prolonged, thereby improving the service life of the male connector; and this arrangement allows the use of an elastic member with a lower elastic modulus, making assembly of the male connector easier.

In some optional embodiments, the first angle ranges from 5° to 15°.

In some optional embodiments, the plug end includes a sealing member embedded in an outer periphery of the plug end for sealing contact with an inner peripheral surface of a housing of the female connector. The sealing member is in the form of an irregular sealing ring, and an inner periphery of the sealing member has two annular flanges arranged along the second axial direction. Each annular flange tapers inwardly in the radial direction. The irregular structure of the sealing ring can prevent the sealing ring from being separated from the plug end when the plug end is required to be plugged or unplugged again and again.

The female connector and the connector assembly according to the present application can realize bidirectional cutoff and absorb installation tolerances in various directions, and have simple assembly process and wide application range.

BRIEF DESCRIPTION OF THE DRAWINGS

Other features and advantages of the present application will be readily understood through the following preferred embodiments described in detail with reference to the accompanying drawings, in which the same reference numerals indicate the same or similar components.

DETAILED DESCRIPTION

Figure 1:
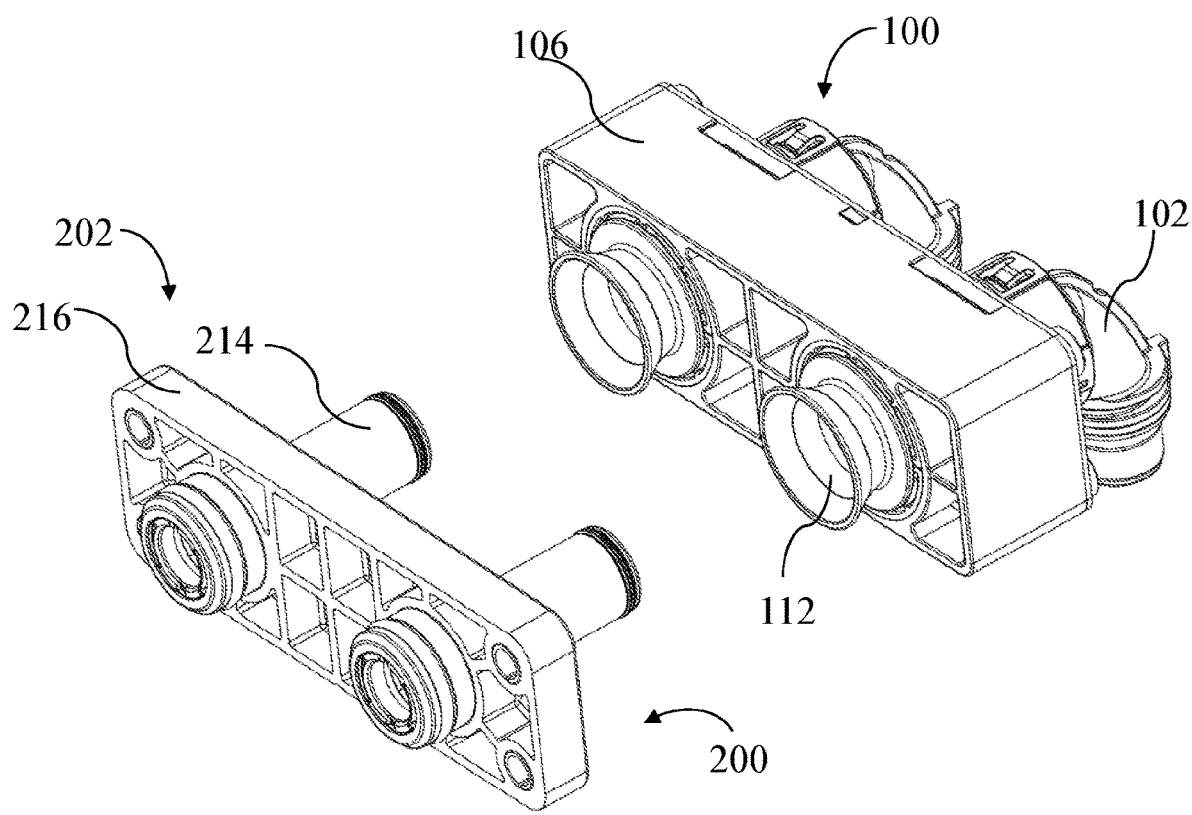
FIG. 1 is a schematic perspective view of a female connector and a male connector of a connector assembly according to an exemplary embodiment of the present application when they are separated from each other.

The implementation and usage of the embodiments are discussed in detail below. However, it is conceivable that the specific embodiments discussed are merely intended to illustrate specific ways of implementing and using the present application, and are not intended to limit the scope of the present application. When describing structures and positions of components, the direction-related expressions herein, such as "upper", "lower", "top", and "bottom", are not absolute, but relative. When the components are arranged as shown in the drawings, these direction-related expressions are appropriate, but when the positions of these components in the drawings are altered, these direction-related expressions should be altered accordingly.

In the present application, an axial direction of a cylindrical or annular component refers to a direction along the central axis of the component, a peripheral direction of the cylindrical or annular component refers to a direction along the circumference of the component, and a radial direction of the cylindrical or annular component refers to a direction passing through the central axis of the component and being perpendicular to the axial direction of the component.

Figure 2:
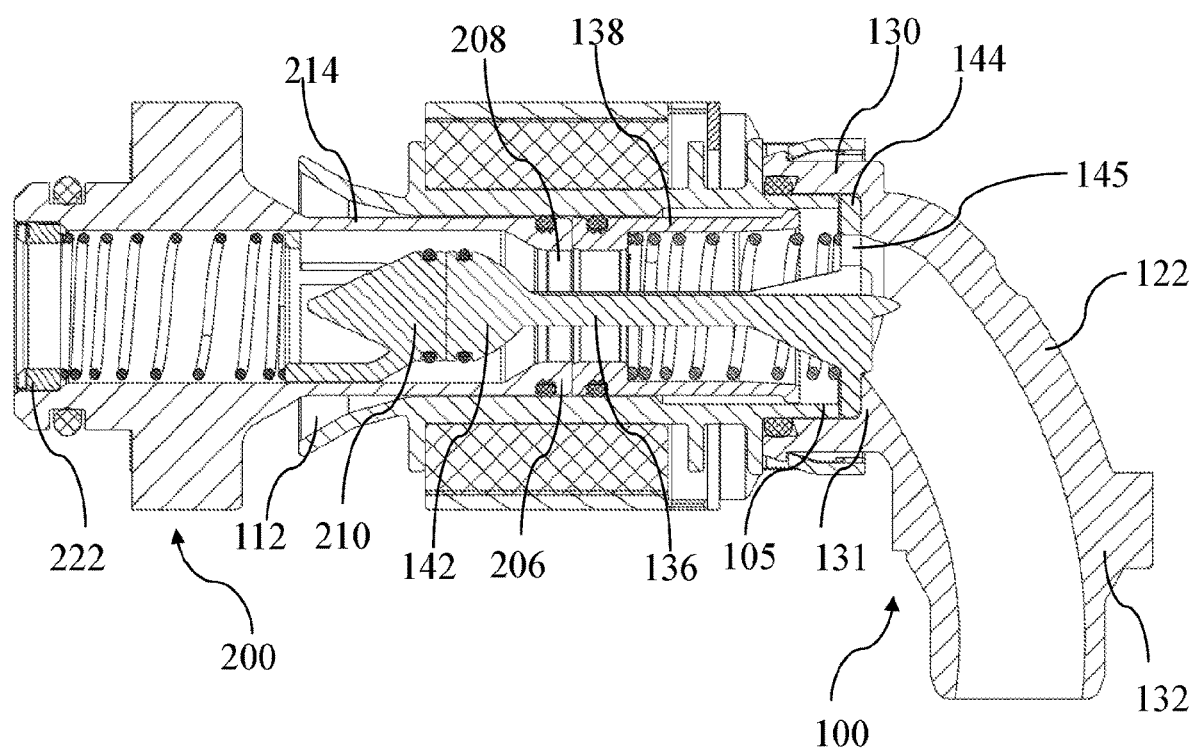
FIG. 2 is a schematic cross-sectional view of the female connector and the male connector of the connector assembly according to the exemplary embodiment of the present application when they are connected with each other.

FIG. 1 and FIG. 2 show a connector assembly 10 according to an exemplary embodiment of the present application. The connector assembly 10 includes a female connector 100 and a male connector 200 for being connected with the female connector 100. The female connector 100 and the male connector 200 may each be connected with a fluid pipeline (not shown).

FIGS. 3A to 12B illustrate the female connector 100 according to the exemplary embodiment of the present application and its components.

Referring to FIGS. 3A to 5, the female connector 100 may include a housing 102, a valve assembly 104, a base 106, a bushing 108, and a mounting member 110. The housing 102 defines a first axial direction A1. The housing 102 has an opening 112, for insertion of the male connector 200, at a first end 103 of the housing 102. And a first limiting member 114 is provided on an outer periphery of the housing 102. The valve assembly 104 is arranged in the housing 102. The base 106 defines a receiving passage 116 extending along the first axial direction A1, and the housing 102 is partially received in the receiving passage 116. The bushing 108 is sleeved outside the housing 102 and arranged in the receiving passage 116 to retain the housing 102 in the receiving passage 116, and the bushing 108 is elastically deformable. The mounting member 110 is fixed to an axial end 118 of the base 106 (that is, the end of the base 106 in the first axial direction A1). The first limiting member 114 is confined in the first axial direction A1 between the axial end 118 and the mounting member 110, and a movement space S (shown in FIG. 3A) for the first limiting member 114 to move therein is defined between the axial end 118 and the mounting member 110.

Figure 4:
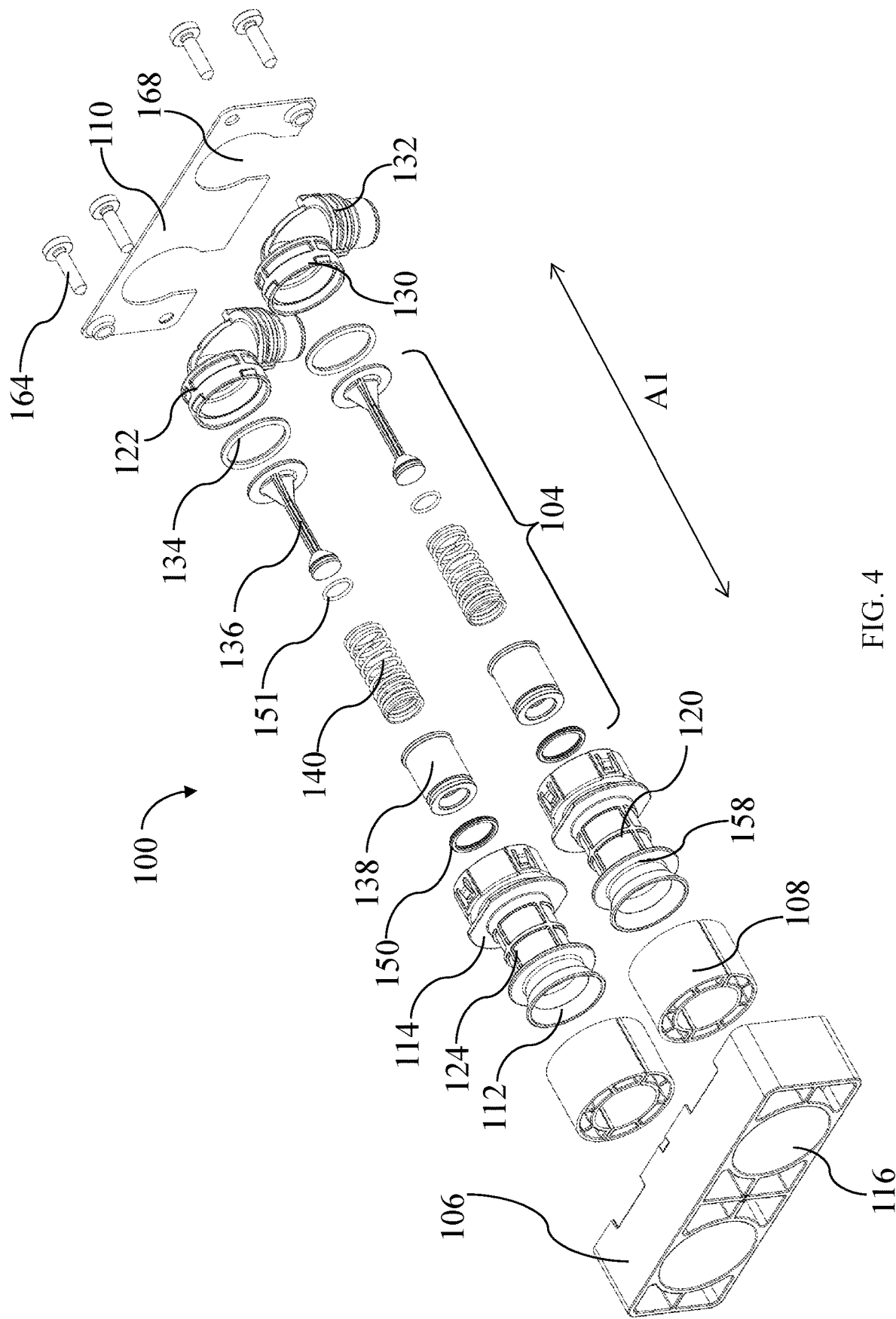
FIG. 4 is a schematic exploded view of the female connector according to the exemplary embodiment of the present application.

Referring to FIG. 4, the housing 102 includes a first housing portion 120 and a second housing portion 122. The first housing portion 120 and the second housing portion 122 may, for example, be separately formed and assembled with each other. This allows the second housing portion 122 to have various configurations to adapt to different pipelines or counterparts, expanding the application range of the female connector 100. The first housing portion 120 and the second housing portion 122 may be formed by, for example, injection molding.

Referring to FIGS. 4, 5 and 9A to 9C, the first housing portion 120 may have a generally straight cylindrical shape and define the first axial direction A1. The first housing portion 120 is received in the receiving passage 116 of the base 106. It should be noted that, unless otherwise specified in this specification, the first axial direction A1 refers to the direction of the central axis of the first housing portion 120 when the first housing portion 120 is coaxial with the receiving passage 116.

The first housing portion 120 may include a first housing body 124 and a retaining ring 128. The first housing body 124 has a first end 103 and a second end 105. The first end 103 of the first housing body 124 has an opening 112 for the insertion of the male connector 200. The opening 112 of the housing 102 has a guide surface 126 for guiding the insertion of the male connector 200 into the housing 102. The retaining ring 128 is provided at the second end 105 of the first housing body 124. In the illustrated embodiment, the second housing portion 122 may have a generally bent cylindrical shape. The second housing portion 122 may include a coupling section 130 that is coupled with the first housing section 120 and an adapter section 132 for being connected with a fluid pipeline. The coupling section 130 of the second housing portion 122 may be at least partially arranged between the second end 105 of the first housing body 124 and the retaining ring 128, and be retained at the second end 105 of the first housing body 124 by barbs 129 of the retaining ring 128. A sealing member 134 is provided between the second end 105 of the first housing body 124 and the coupling section 130 to achieve a sealed assembly of the first housing portion 120 and the second housing portion 122.

Referring to FIG. 4, the valve assembly 104 may include a valve stem 136, a sliding sleeve 138 and an elastic element 140. Optionally, the valve stem 136 and the sliding sleeve 138 may both be formed by injection molding.

Figure 5:
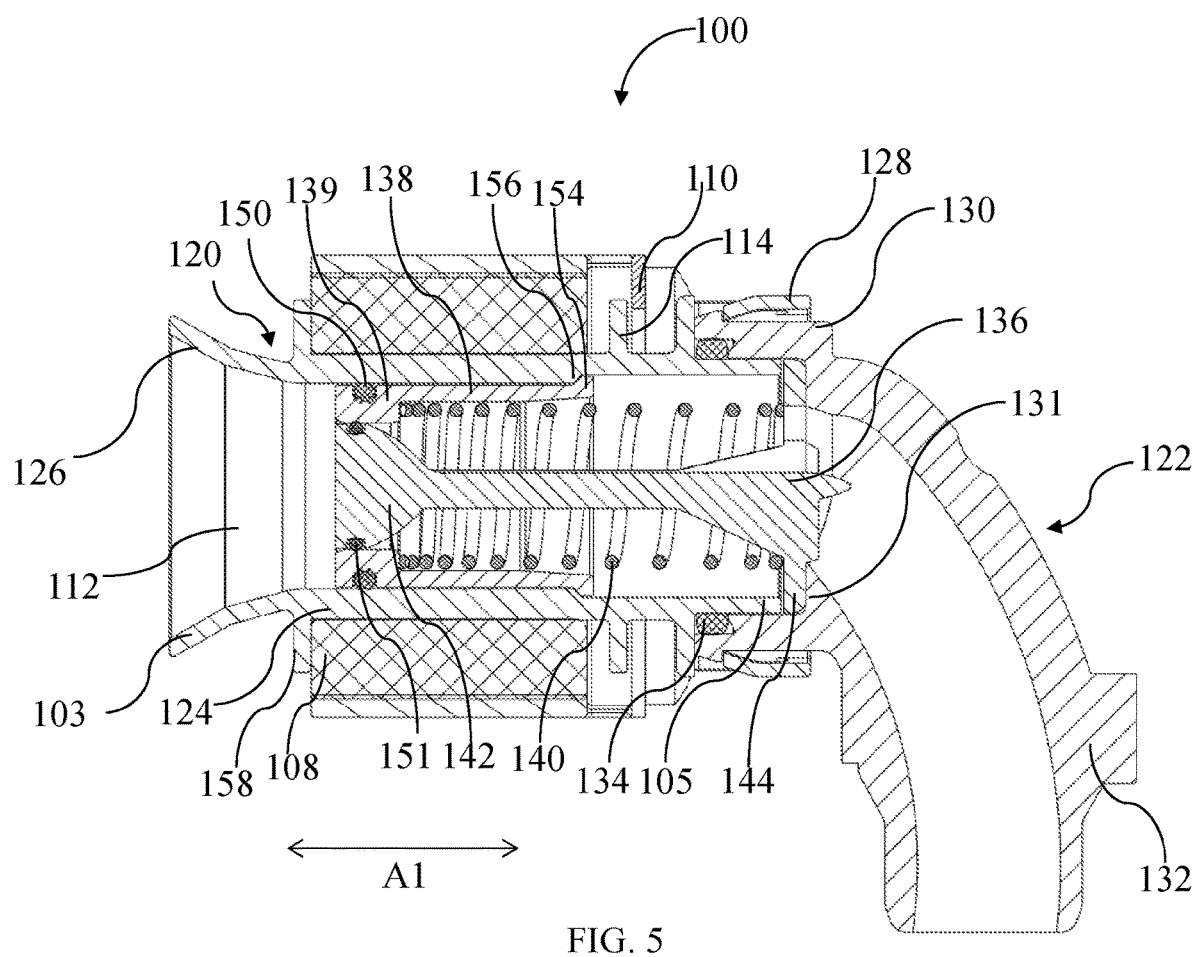
FIG. 5 is a schematic cross-sectional view of the female connector according to the exemplary embodiment of the present application.
Figure 6A:
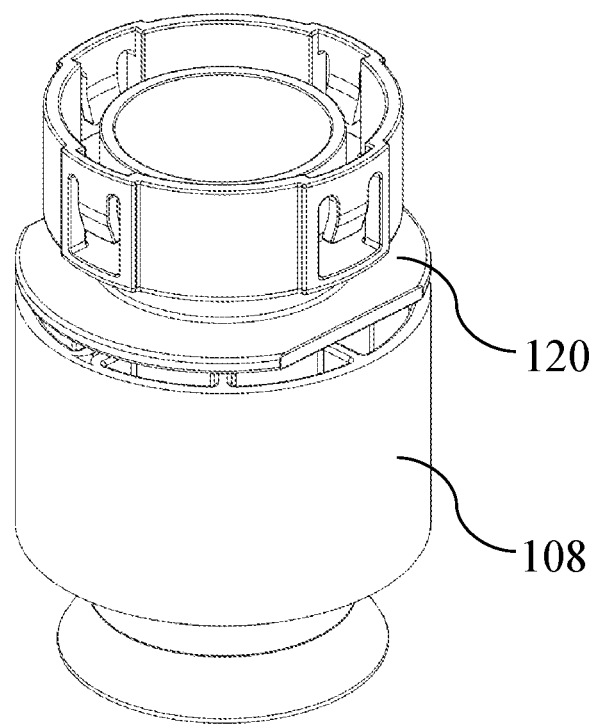
FIG. 6A and FIG. 6B respectively are a schematic perspective view and a schematic plan view of a bushing and a first housing portion of the female connector according to the exemplary embodiment of the present application when they are assembled together.
Figure 6B:
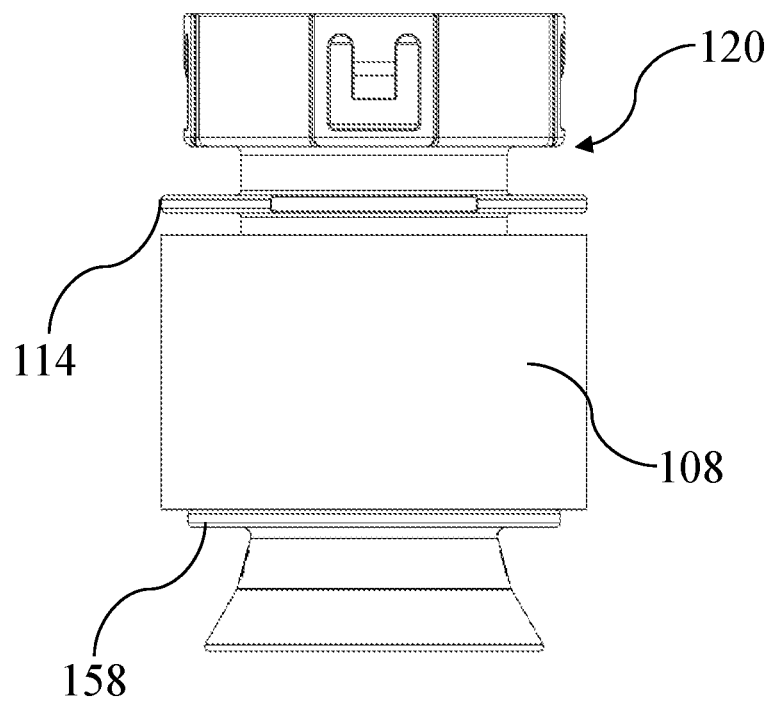
Figure 10A:
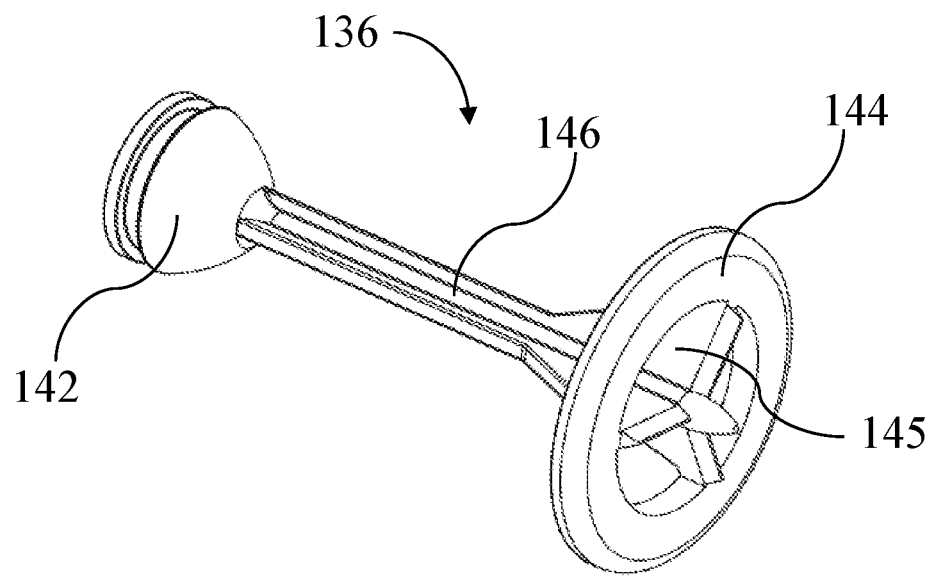
FIG. 10A and FIG. 10B respectively are a schematic perspective view and a schematic plan view of a valve stem of the female connector according to the exemplary embodiment of the present application.
Figure 10B:
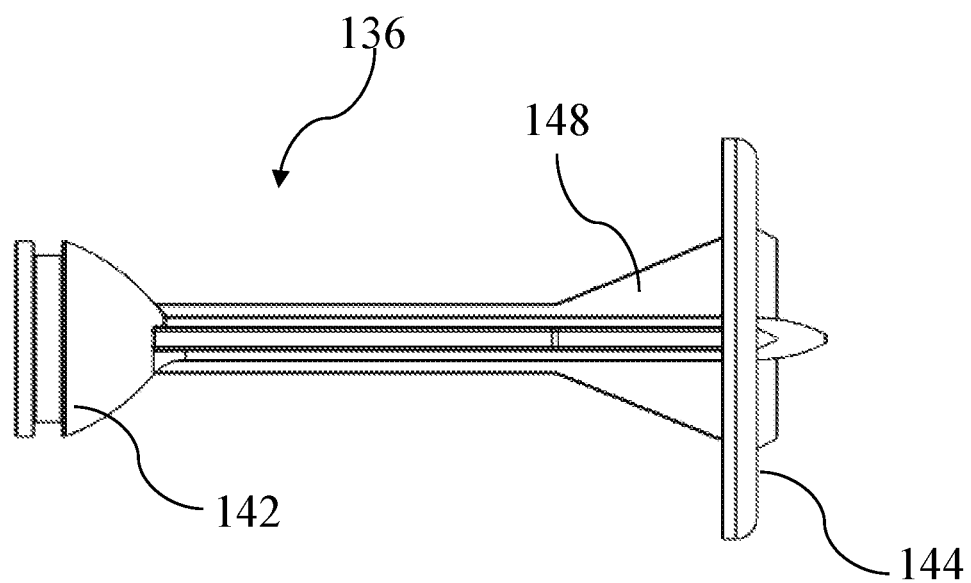
Figure 11A:
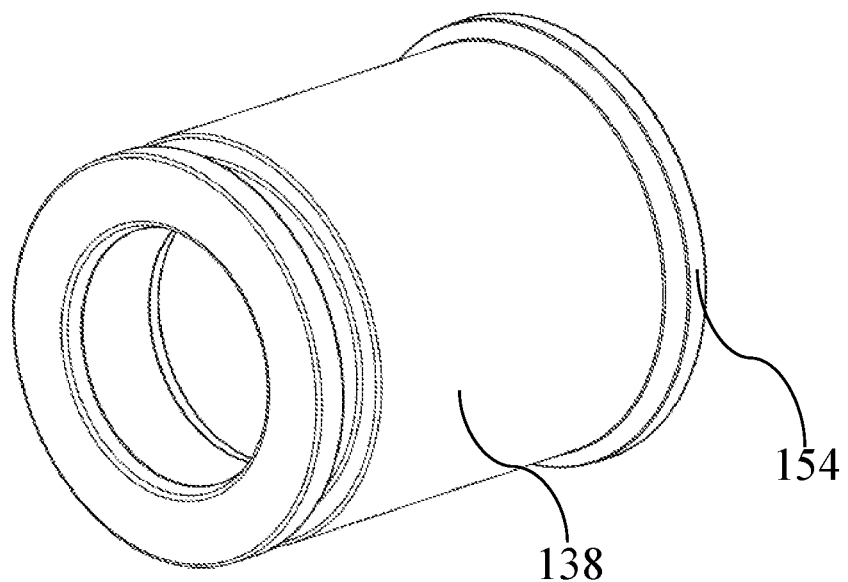
FIG. 11A and FIG. 11B respectively are a schematic perspective view and a schematic plan view of a sliding sleeve of the female connector according to the exemplary embodiment of the present application.
Figure 11B:
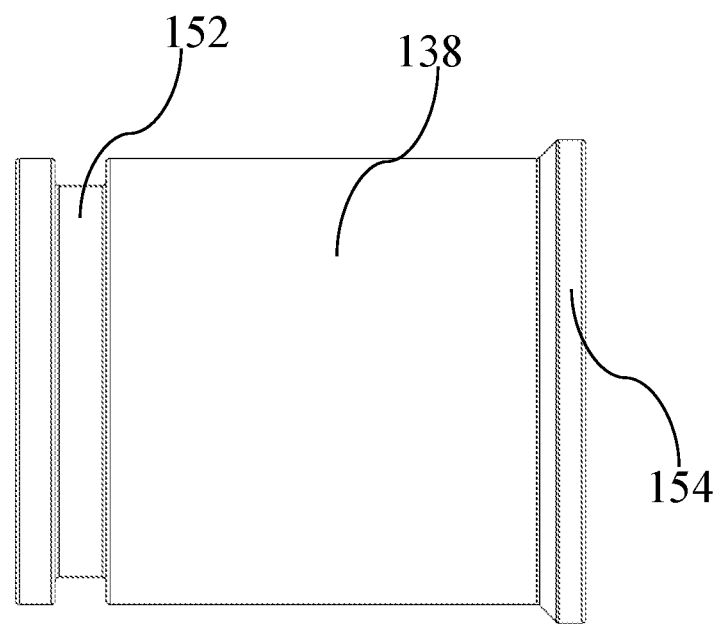

Referring to FIGS. 5, 10A and 10B, the valve stem 136 may be positioned in the housing 102 in the first axial direction A1. The valve stem 136 may include a valve stem head 142 and a valve stem base 144 which are respectively located at two ends of the valve stem 136, and include a valve stem middle portion 146 connecting the valve stem head 142 with the valve stem base 144. In the illustrated embodiment, the valve stem 136 is integrally formed. The valve stem base 144 is substantially disc-shaped and two opposite side surfaces of the valve stem base 144 are substantially perpendicular to the first axial direction A1. The valve stem base 144 may be fixed by the first housing portion 120 and the second housing portion 122. Specifically, the coupling section 130 of the second housing portion 122 may include an inner stepped portion 131. The valve stem base 144 may be at least partially sandwiched between the second end 105, away from the opening 112, of the first housing portion 120 and the inner stepped portion 131 of the second housing portion 122. The valve stem base 144 may be provided with through holes 145 extending through the two side surfaces for fluid to flow therethrough. The valve stem middle portion 146 substantially extends along the first axial direction A1. The valve stem middle portion 146 is further provided with multiple reinforcing ribs 148 to increase the strength of the valve stem 136. The valve stem head 142 may gradually widen toward the opening 112 in the first axial direction A1 such that the valve stem head 142 has a substantially funnel-shaped cross-section.

Referring to FIGS. 4, 5, 11A, and 11B, the sliding sleeve 138 is arranged in the first housing portion 120 and is sleeved outside the valve stem 136, and the sliding sleeve 138 is slidable between the first closed position (shown in FIG. 5) and the first open position (shown in FIG. 2) along the first axial direction A1. A sealing member 150 is provided between the outer peripheral surface of the sliding sleeve 138 and the inner peripheral surface of the first housing body 124. A sealing member 151 is provided between the inner peripheral surface of the sliding sleeve 138 and the outer peripheral surface of the valve stem head 142. In the illustrated embodiment, the sealing member 150 is in the form of an irregular sealing ring. The sealing member 150 is embedded in the outer periphery of the sliding sleeve 138, i.e., received in an annular groove 152 in the outer periphery of the sliding sleeve 138, for sealing contact with the inner peripheral surface of the first housing portion 120.

Figure 12A:
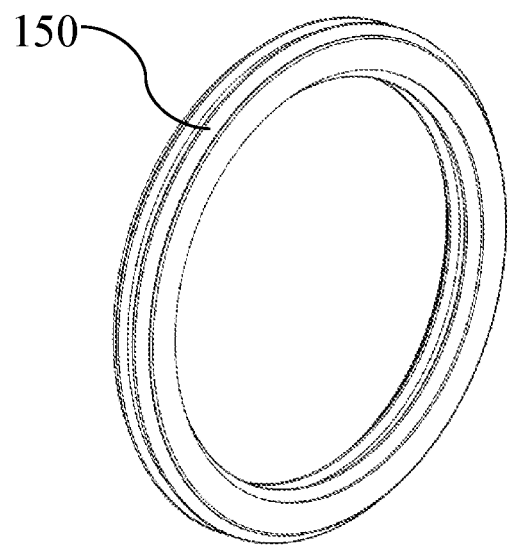
FIG. 12A and FIG. 12B respectively are a schematic perspective view and a schematic partial plan view of a sealing member of the female connector according to the exemplary embodiment of the present application.
Figure 12B:
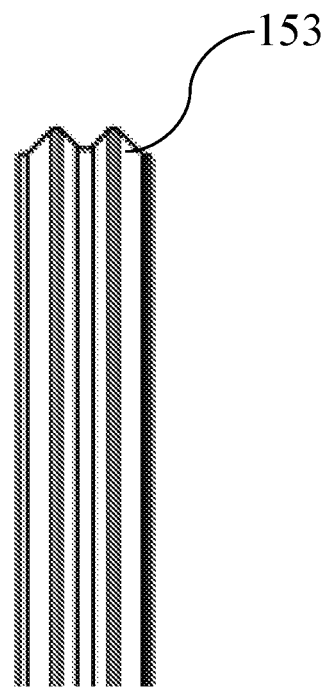
Figure 13A:
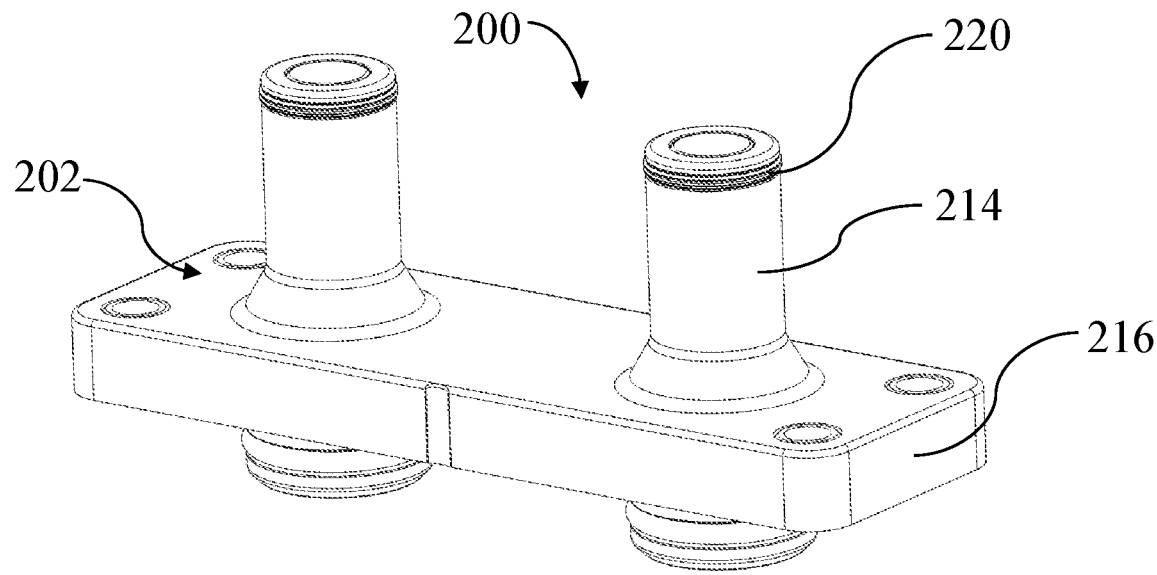
FIG. 13A and FIG. 13B respectively are a schematic perspective view and a schematic plan view of the male connector according to the exemplary embodiment of the present application.
Figure 13B:
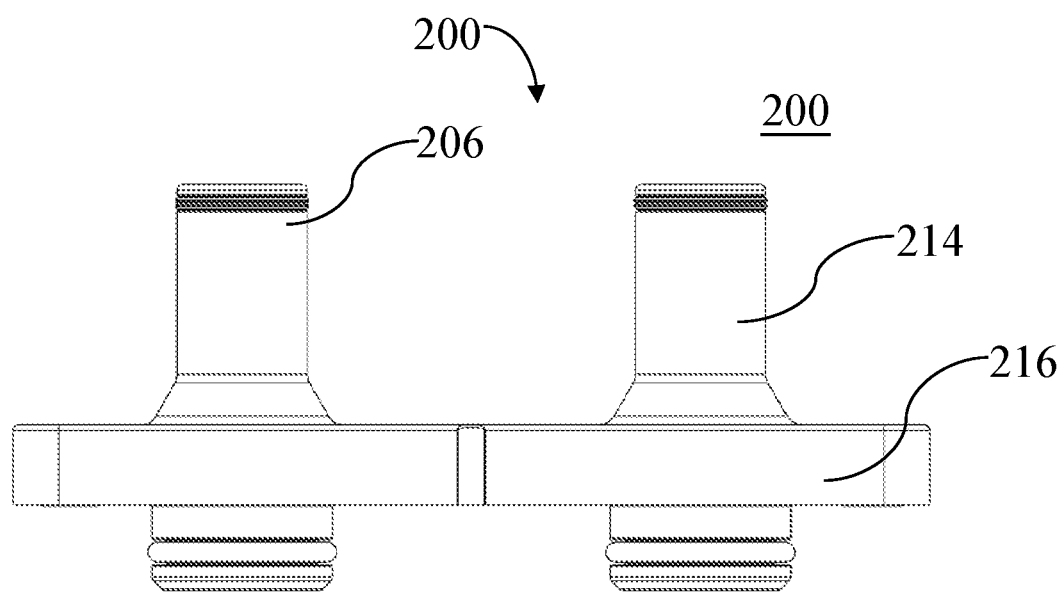

With reference to FIG. 12A and FIG. 12B, the outer periphery of the sealing member 150 has two annular flanges 153 arranged along the first axial direction A1, and each annular flange 153 tapers outward in the radial direction.

Similarly, the inner periphery of the sealing member 150 has two annular flanges 155 arranged along the first axial direction A1, and each annular flange 155 tapers inward in the radial direction.

Compared with a conventional sealing ring with a circular cross-section, the external force, required to draw the irregular sealing member 150 having two annular flanges on the inner periphery out of the annular groove 152 of the sliding sleeve 138, is significantly increased, so that the sealing member 150 can be held more securely in the annular groove 152, thereby preventing the sealing member 150 from being separated from the sliding sleeve 138 as the sliding sleeve 138 reciprocates between the first closed position and the first open position.

Referring to FIGS. 4, 5, 11A, and 11B, two ends of the elastic element 140 abut against an inner stepped portion 139 of the sliding sleeve 138 and the valve stem base 144 respectively. Optionally, the elastic element 140 may be in the form of a coil spring. The sliding sleeve 138 is biased towards the first closed position by the elastic force of the elastic element 140. The outer periphery of the sliding sleeve 138 is provided with a limiting protrusion 154. The inner periphery of the first housing portion 120 is provided with a limiting surface 156. The limiting protrusion 154 and the limiting surface 156 may abut against each other to limit the sliding sleeve 138 in the first closed position.

When the sliding sleeve 138 is biased in the first closed position by the elastic member 140, the outer and inner peripheral surfaces of the sliding sleeve 138 respectively contact the inner peripheral surface of the first housing portion 120 and the outer peripheral surface of the valve stem head 142, so as to block the annular gap between the first housing portion 120 and the valve stem head 142 to further cut off the flow path of the female connector 100. When the sliding sleeve 138 is pushed by an external force along the first axial direction A1, the sliding sleeve 138 can resist the elastic force of the elastic element 140 and move away from the valve stem head 142 to the first open position, so that the flow path of the female connector 100 is opened. With reference to FIG. 2, when the sliding sleeve 138 is in the first open position, the fluid may flow through the gap between the sliding sleeve 138 and the valve stem 136, and then flow into the second housing portion 122 through the through holes 145 in the valve stem base 144, and then flow into the fluid pipeline (not shown) connected with the female connector 100. Similarly, the fluid may flow into the housing 102 from the fluid pipeline connected with the female connector 100 along a reverse direction and then flow out of the housing 102.

Referring to FIGS. 4, 5, and 9A to 9C, the female connector 100 may be fixed to the application environment, in which the female connector 100 is to be applied, via a connecting structure (not shown) on the base 106. The first housing portion 120 of the female connector 100 may be partially received and retained in the receiving passage 116 of the base 106 via the bushing 108. The first housing portion 120 may have a first limiting member 114 and a second limiting member 158. The first limiting member 114 and the second limiting member 158 extend around the first housing body 124 and are spaced apart along the first axial direction A1. The bushing 108 is sleeved outside the first housing body 124 and is confined between the first limiting member 114 and the second limiting member 158.

Referring to FIGS. 4, 5, and 8A to 9C, the bushing 108 may be made of thermoplastic elastomer or rubber material, and at least one cavity 160 is defined in a peripheral wall of the bushing 108. In the illustrated embodiment, the bushing 108 has multiple cavities 160 arranged in the peripheral direction of the bushing and extending in the first axial direction A1 to facilitate elastic deformation of the bushing 108. It is conceivable that the bushing 108 may have any other suitable multi-cavity configuration. For example, the peripheral wall of the bushing may be honeycomb-shaped.

The bushing 108 has a slit 162 extending in the first axial direction A1. The first housing body 124 may be nested in the bushing 108 via the slit 162. The inner diameter of the bushing 108 may be substantially equal to the outer diameter of a portion of the first housing body 124 located between the first limiting member 114 and the second limiting member 158. The outer diameter of the bushing 108 may be substantially equal to or slightly larger than the inner diameter of the receiving passage 116. The first limiting member 114 and the second limiting member 158 are shaped and/or sized such that: the second limiting member 158 can be inserted through the receiving passage 116, and the first limiting member 114 is stopped outside the receiving passage 116. In the embodiment shown in FIG. 9A to FIG. 9C, the outer diameter of an arc portion of the first limiting member 114 is larger than the inner diameter of the receiving passage 116, and the outer diameter of the second limiting member 158 is smaller than the inner diameter of the receiving passage 116, so that the second limiting member 158 of the first housing portion 120 can be inserted through the receiving passage 116, while the first limiting member 114 cannot enter the receiving passage 116.

In addition, the length of the bushing 108 (that is, the length of the bushing 108 in the first axial direction A1) may be smaller than a distance between the first limiting member 114 and the second limiting member 158 in the first axial direction A1.

Figure 16:
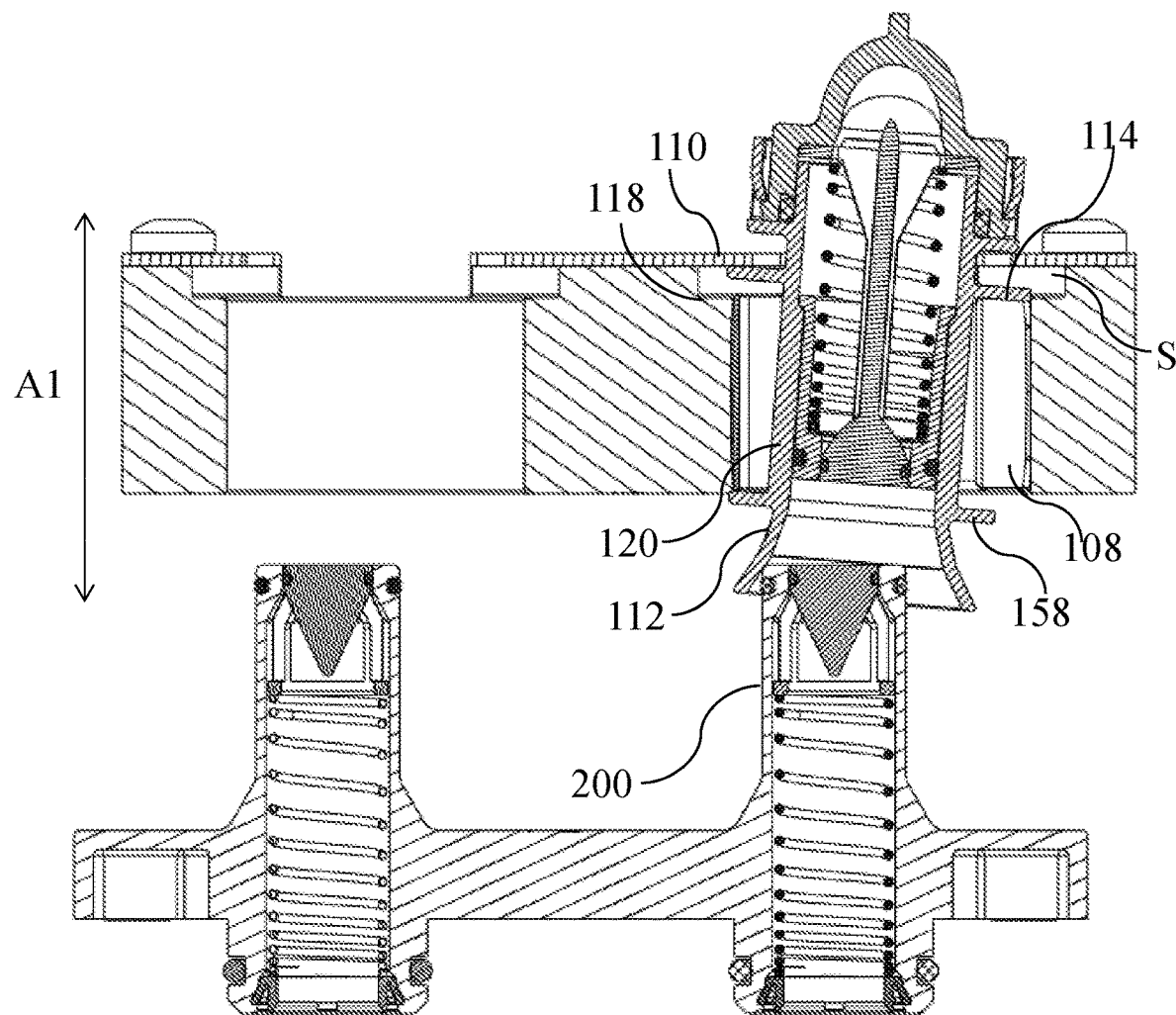
FIG. 16 is a schematic cross-sectional view of the female connector and the male connector of the connector assembly according to the exemplary embodiment of the present application when they are being connected.

Referring to FIG. 5 and FIG. 16, since the length of the bushing 108 is smaller than the distance between the first limiting member 114 and the second limiting member 158, there is a certain space between the limiting member, that is the first limiting member 114 and/or the second limiting member 158, and the axial end of the bushing 108. If the male connector 200 is not fully aligned with the opening 112 of the first housing portion 120 when inserted and the first housing portion 120 is thereby deflected within the bushing 108, the first limiting member 114 and the second limiting member 158 will first deflect accordingly and easily due to this space, and two axial ends of the bushing 108 will not immediately resist the deflection of the first limiting member 114 and the second limiting member 158 as the first housing portion 120 starts to deflect, which can reduce the insertion force of the male connector 200 (especially in the case that the axial stiffness of the bushing 108 is relatively large), thereby reducing the risk of damage to the female connector 100.

It is conceivable that if the length of the bushing 108 is equal to the distance between the first limiting member 114 and the second limiting member 158, once the first housing portion 120 is deflected, the two axial ends of the bushing 108 will respectively abut against the first limiting member 114 and the second limiting member 158 and resist this deflection with a large force (especially in the case that the axial stiffness of the bushing 108 is relatively large), which will result in a large insertion force of the male connector 200 and in turn increase the risk of damage to the female connector.

Figure 3A:
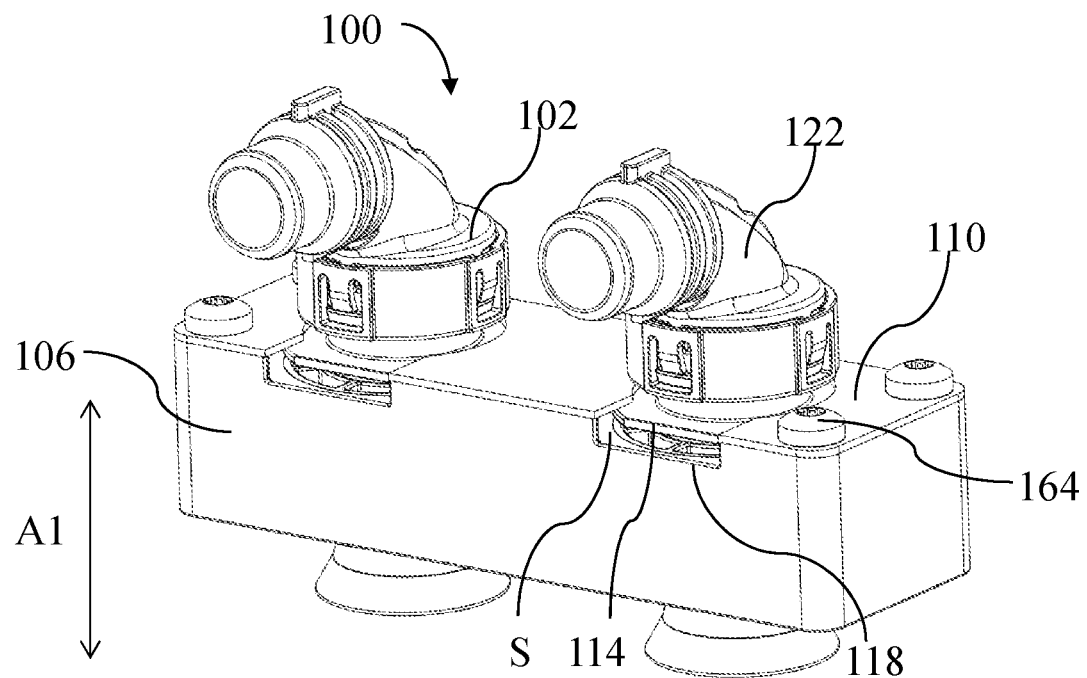
FIG. 3A and FIG. 3B respectively are a schematic perspective view and a schematic plan view of the female connector according to the exemplary embodiment of the present application.
Figure 3B:
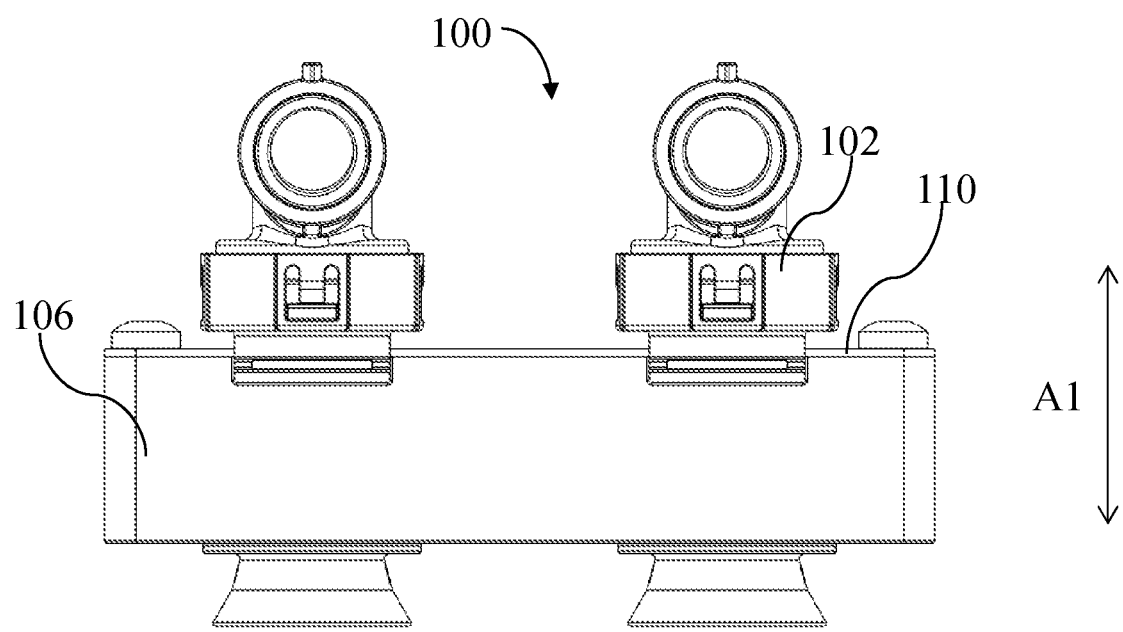
Figure 7:
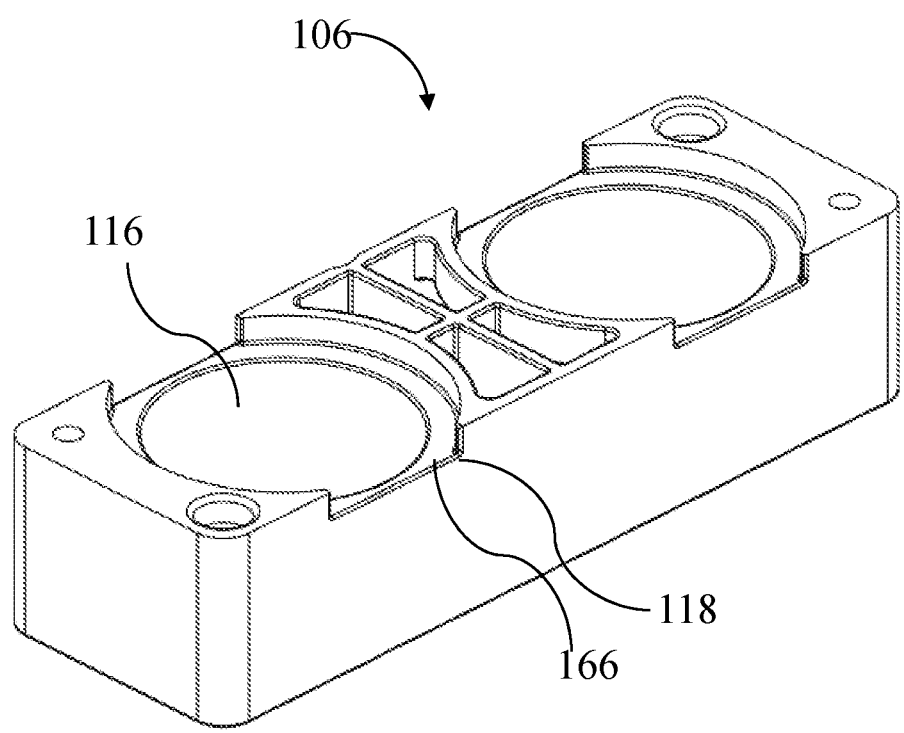
FIG. 7 is a schematic perspective view of a base of the female connector according to the exemplary embodiment of the present application.
Figure 8A:
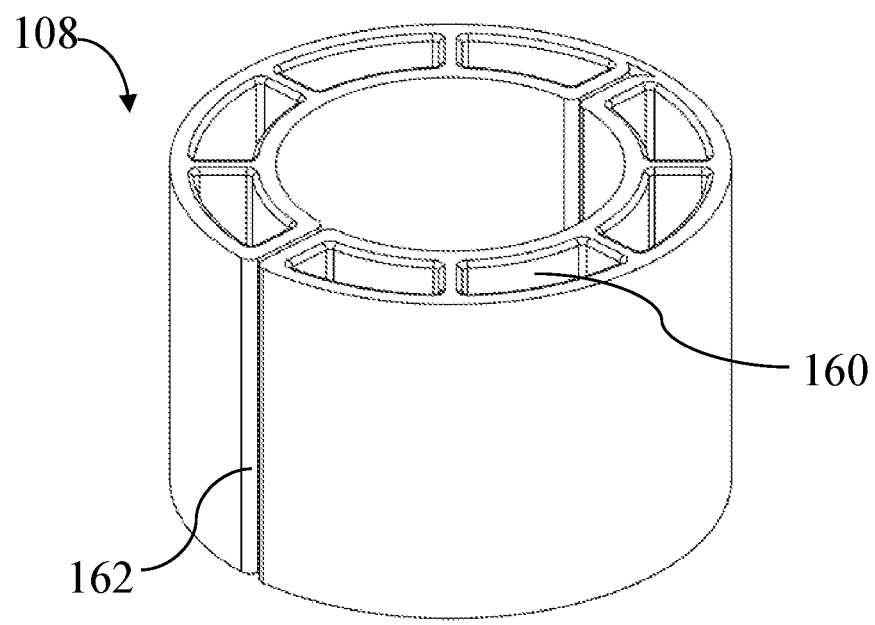
FIG. 8A and FIG. 8B respectively are a schematic perspective view and a schematic plan view of the bushing of the female connector according to the exemplary embodiment of the present application.
Figure 8B:
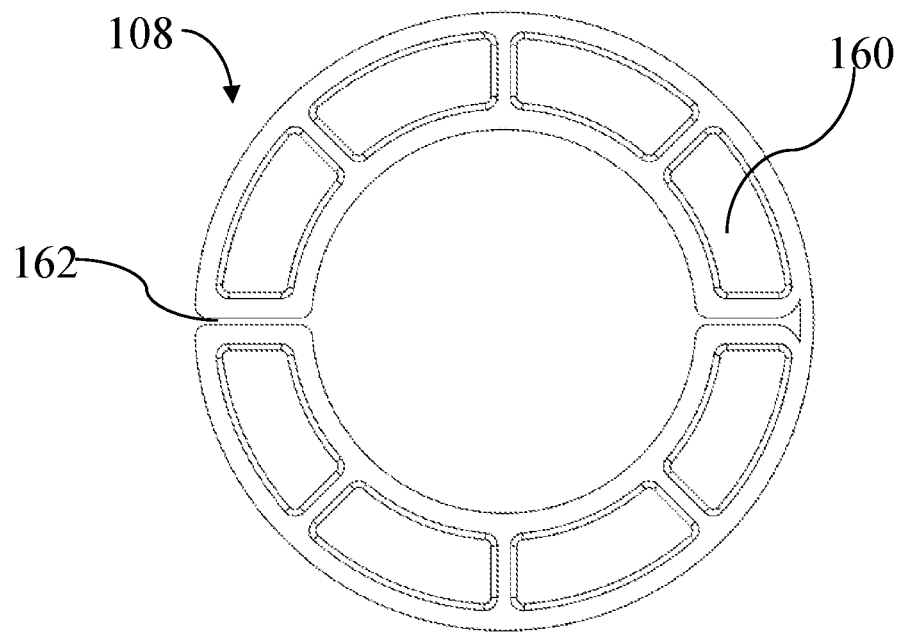
Figure 9A:
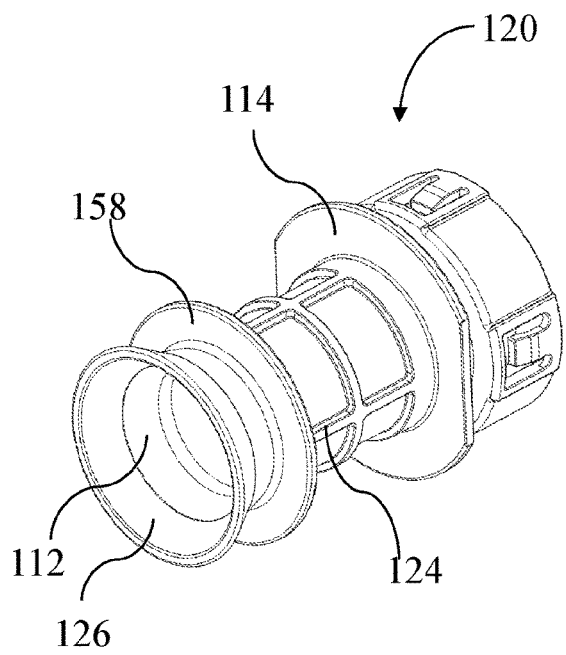
FIG. 9A and FIG. 9B respectively are schematic perspective views of the first housing portion of the female connector according to the exemplary embodiment of the present application, viewed from different perspectives.
Figure 9B:
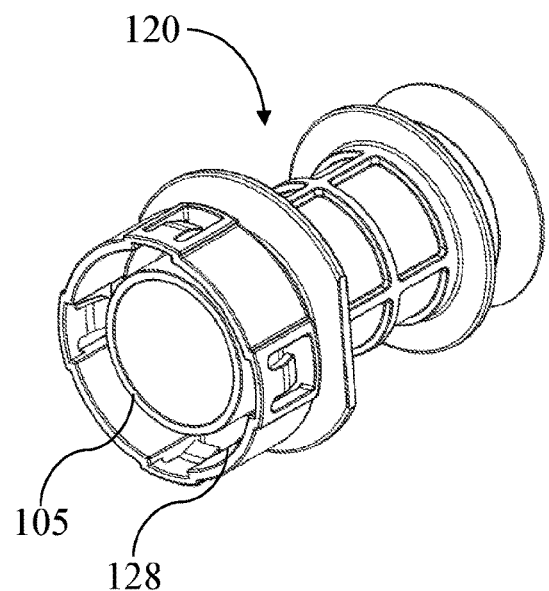
Figure 9C:
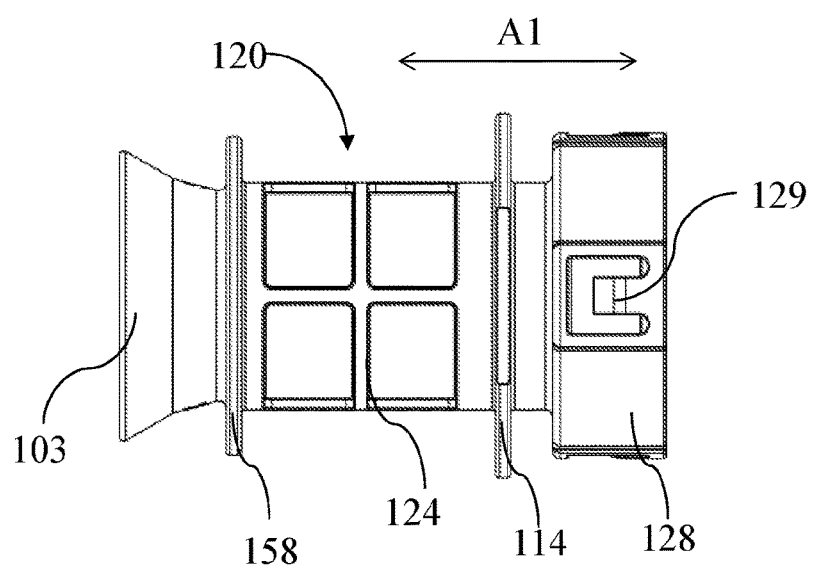
FIG. 9C is a schematic plan view of the first housing portion of the female connector according to the exemplary embodiment of the present application.

Referring to FIG. 3A and FIG. 7, the first limiting member 114 located outside the receiving passage 116 may be limited by the mounting member 110. The mounting member 110 may be in the form of a plate and extend substantially perpendicular to the first axial direction A1. The mounting member 110 may be fixed to the axial end 118 of the base 106, for example, via fasteners 164, so as to confine the first limiting member 114 between the axial end 118 and the mounting member 110 in the first axial direction A1. The movement space S for the first limiting member 114 to move therein is defined between the axial end 118 and the mounting member 110. The axial end 118 of the base 106 may be provided with a recess 166. The recess 166 is adjacent to and communicated with the receiving passage 116 in the first axial direction A1. The shape and/or size of the recess 166 are such designed that the recess 166 can accommodate the first limiting member 114. The recess 166 and the mounting member 110 define the movement space S for the first limiting member 114 to move therein.

It is conceivable that, in the case that the mounting member 110 has a certain thickness, a recess may be provided on a side of the mounting member 110 facing the base 106, so as to define together with the axial end 118 of the base 106 a movement space for the first limiting member 114 to move therein. The movement of the first limiting member 114 herein includes but is not limited to: rotation around the first axial direction A1, movement along the first axial direction A1, movement in a direction perpendicular to the first axial direction A1, and deflection of the first limiting member 114 (that is, movement of the first limiting member 114 with its normal direction inclining respect to the first axial direction A1).

The female connector retains the first housing portion 120 in the base 106 by using the elastically deformable bushing 108, and confines the first limiting member 114 of the first housing portion 120 between the base 106 and the mounting member 110 in a movable manner. Such configuration of female connector can absorb the assembly tolerances in various directions when the female connector 100 is connected with the male connector 200, which will be described in detail below, and also allows the housing 102 to rotate within the base 106, so that the circumferential orientation of the second housing portion 122 can be adjusted as required, thereby allowing optimization of the layout of the fluid pipeline connected to the female connector 100.

Referring to FIG. 4 and FIG. 7, the mounting member 110 may include openings 168 open on one side to avoid mechanical interference with the housing 102 when the mounting member 110 is mounted on the base 106 along the direction perpendicular to the first axial direction A1.

When the female connector 100 is assembled, the valve assembly 104 is placed within the first housing portion 120, and the second housing portion 122 is coupled with the second end 105 of the first housing portion 120, so that the valve assembly 104 is retained within the housing 102. Then, the bushing 108 is sleeved outside the portion of the first housing portion 120 between the first limiting member 114 and the second limiting member 158. In this way, an assembly structure of the housing 102, the valve assembly 104 and the bushing 108 can be obtained. Then, the assembly structure is inserted into the receiving passage 116 of the base 106, so that the second limiting member 158 of the first housing portion 120 is inserted through the receiving passage 116, while the first limiting member 114 is located in the recess 166 at the axial end 118 of the base 106. Then, the mounting member 110 is passed through the portion of the first housing portion 120 between the first limiting member 114 and the retaining ring 128 in the direction perpendicular to the first axial direction A1, and is then placed on the base 106 such that fastening points on the mounting member 110 and the base 106 are aligned. And then the mounting member 110 is secured to the base 106 via the fasteners 164. In this way, the first limiting member 114 of the first housing portion 120 is confined between the axial end 118 of the base 106 and the mounting member 110, such that the first limiting member 114 is movable between the axial end 118 of the base 106 and the mounting member 110 while the housing 102 is prevented from being separated from the base 106. It is conceivable that the above assembly steps are merely examples, and the assembly can be done in other sequences.

In the illustrated embodiment, the base 106 of the female connector 100 may be provided with two receiving passages 116, and the female connector 100 may correspondingly have two housings 102, two bushings 108 and two valve assemblies 104, where the two housings 102 may be fixed to the base 106 via one mounting member 110 having two openings 168. It is conceivable that the two housings 102 may also be fixed by two mounting members each having one opening. It is conceivable that the base 106 of the female connector 100 may accordingly be provided with one or more than two receiving passages, and the female connector 100 may include a corresponding number of housings, bushings and valve assembly/assemblies.

FIGS. 13A to 15C illustrate the male connector 200 according to the exemplary embodiment of the present application and its components.

Referring to FIGS. 2, and 13A to 15A, the male connector 200 includes a casing 202 and a valve unit 204. The casing 202 defines a second axial direction A2 and has a plug end 206 in the second axial direction A2, and the plug end 206 defines a port 208 (shown in FIG. 2). The valve unit 204 is arranged within the casing 202 and includes a valve core 210 and an elastic member 212. The valve core 210 is movable in the second axial direction A2 between a second closed position (shown in FIG. 15A) and a second open position (shown in FIG. 2). The valve core 210 is biased toward the second closed position by the elastic member 212. The valve core 210 blocks the port 208 to cut off a flow path of the male connector 200 when the valve core 210 is in the second closed position, and the flow path of the male connector 200 is opened when the valve core 210 is in the second open position.

The casing 202 includes a casing body 214 and a base plate 216. In the illustrated embodiment, the casing body 214 may be substantially cylindrical, and can be formed integrally with the base plate 216. Optionally, the casing body 214 may be formed by injection molding. The male connector 200 may be fixed to the application environment in which the male connector 200 is to be applied via the base plate 216.

Referring to FIGS. 14, and 15A to 15C, the casing body 214 defines the second axial direction A2. The casing body 214 has the plug end 206 for insertion into the housing 102 of the female connector 100. The plug end 206 has a peripheral edge 218 that protrudes inwardly in the radial direction. The peripheral edge 218 defines the port 208 (shown in FIG. 2). The plug end 206 includes a sealing member 220 embedded in its outer periphery. The sealing member 220 of the plug end 206 may have the same configuration as the sealing member 150 of the female connector 100 described above, so as to prevent the sealing member 220 from being separated from the plug end 206 as the male connector 200 is connected with or disconnected from the female connector 100 again and again.

The valve unit 204 may be arranged within the casing body 214. The valve unit 204 may further include a mounting ring 222. The valve core 210 and the elastic member 212 of the valve unit 204 may be mounted in the casing body 214 via the mounting ring 222. The mounting ring 222 may be detachably connected to an end, opposite to the plug end 206, of the casing body 214. When the male connector 200 is assembled, the valve unit 204 may be placed in the casing body 214, and then the mounting ring 222 may be mounted at the end, away from the port 208, of the casing body 214. The assembly method is simple and efficient.

The valve core 210 may include a valve core head 224 and a bracket 226. The valve core head 224 may gradually widen toward the port 208 in the second axial direction A2 such that the valve core head 224 has a substantially funnel-shaped cross-section. A sealing member 228 may be provided between the outer peripheral surface of the valve core head 224 and the inner peripheral surface of the casing body 214. In the illustrated embodiment, the sealing member 228 is embedded in the outer periphery of the valve core head 224, that is, received in an annular groove 230 of the valve core head 224, for sealing contact with the inner peripheral surface of the port 208.

One end of the elastic member 212 may abut against the bracket 226 of the valve core 210, and another end of the elastic member 212 may abut against the mounting ring 222, so as to bias the valve core 210 toward the second closed position for blocking the port 208. When the valve core 210 is biased in the second closed position by the elastic member 212, the valve core head 224 is in sealing contact with the inner peripheral surface of the port 208, so that the flow path of the male connector 200 is cut off. When the valve core 210 is pushed by an external force along the second axial direction A2, the valve core 210 can resist the elastic force of the elastic member 212 and move away from the port 208 to the second open position, so that the flow path of the male connector 200 is opened. Referring to FIG. 2, when the valve core 210 is in the second open position, the fluid can enter the casing body 214 from the port 208 of the casing body 214 and flow through a gap between the casing body 214 and the valve core head 224, then flow through the mounting ring 222, and thus flow into the fluid pipeline (not shown) connected with the male connector 200. Similarly, the fluid may flow into the casing body 214 from the fluid pipeline connected with the male connector 200 along a reverse direction and finally flow out from the port 208 of the casing body 214.

Figure 15A:
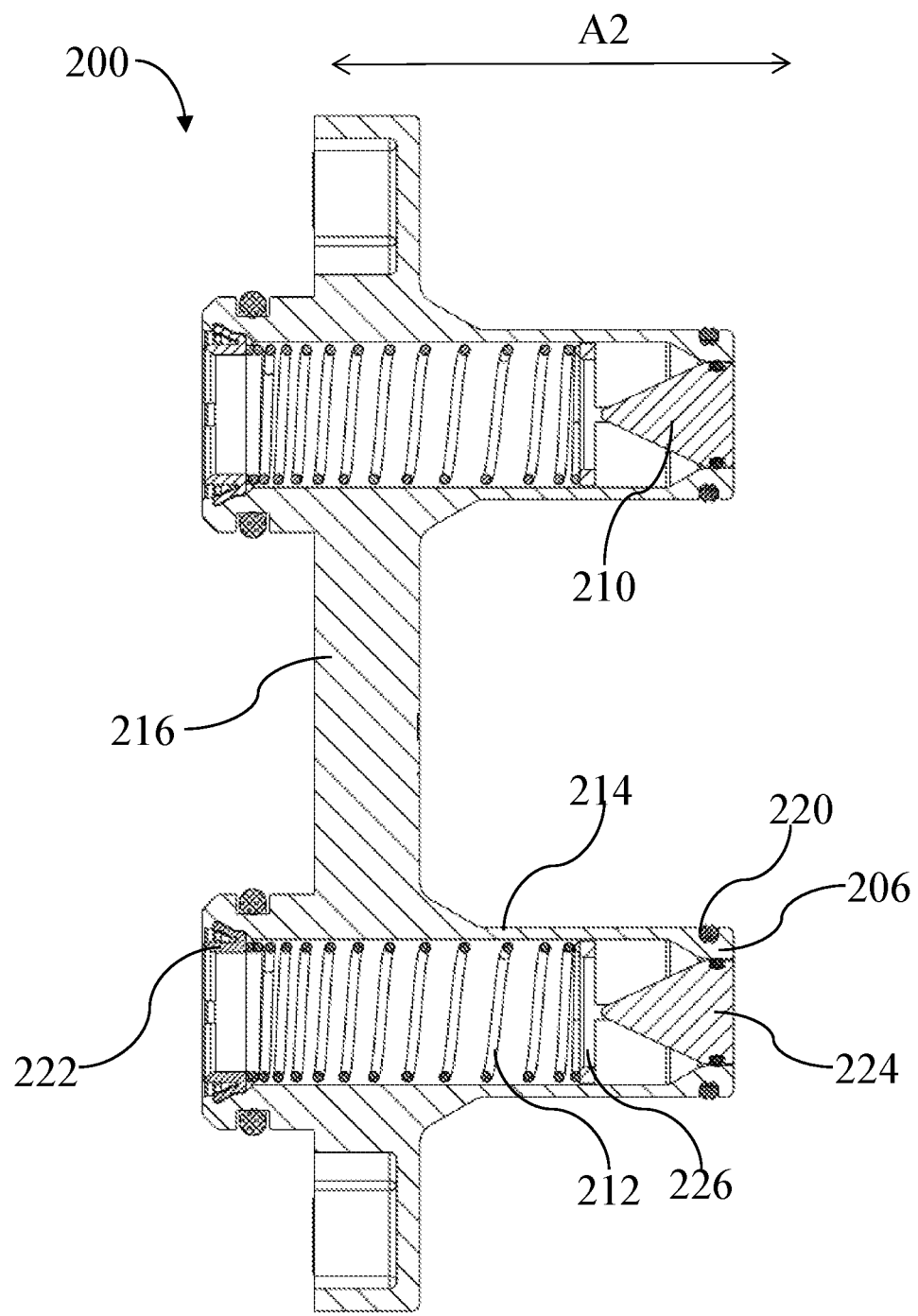
FIG. 15A and FIG. 15B respectively are schematic cross-sectional views of the male connector according to the exemplary embodiment of the present application, taken along different cross-sections.
Figure 15B:
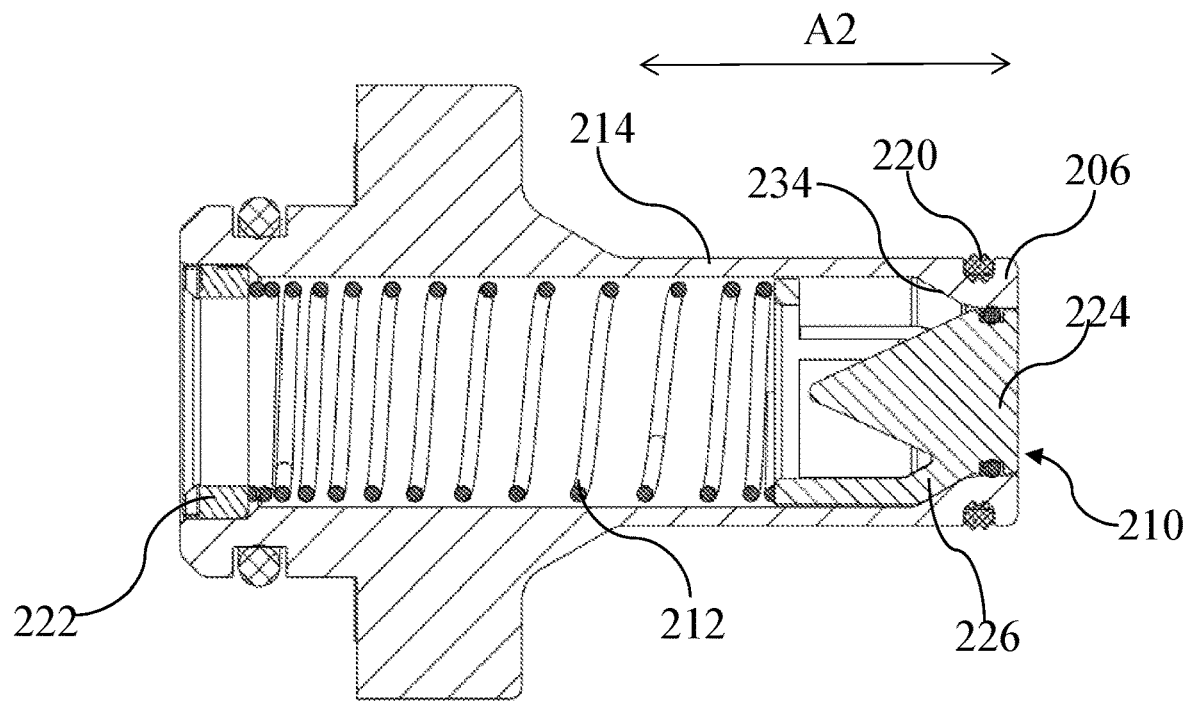
Figure 15C:
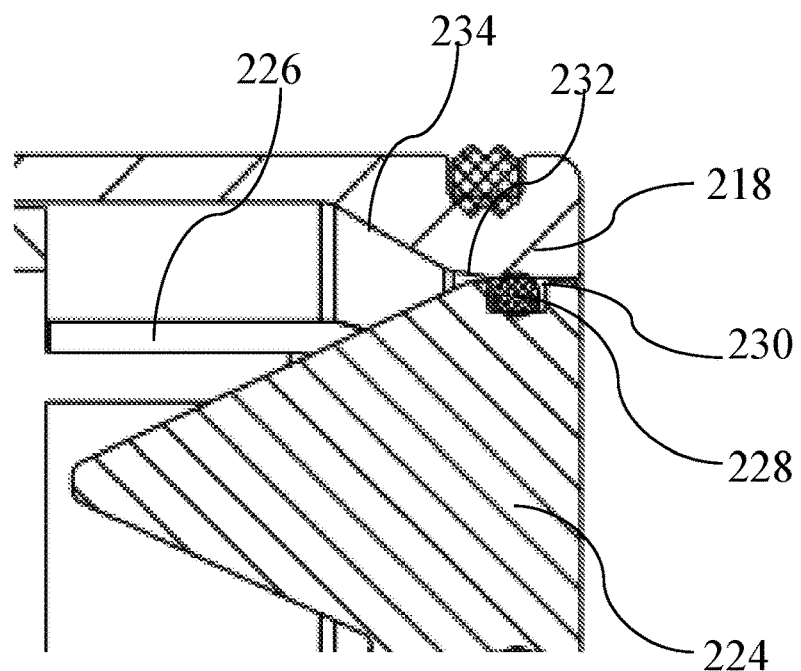
FIG. 15C is a partly enlarged view of FIG. 15B.

Referring to FIGS. 2, 15B and 15C, the peripheral edge 218 of the plug end 206 may define a first inner peripheral inclined surface 232 and a second inner peripheral inclined surface 234. The inner peripheral surface of the port 208, the first inner peripheral inclined surface 232, and the second inner peripheral inclined surface 234 are sequentially connected in the second axial direction A2, and the first inner peripheral inclined surface 232 and the second inner peripheral inclined surface 234 are configured to guide the sealing member 228 embedded in the outer periphery of the valve core 210 to move in the second axial direction A2 into sealing contact with the inner peripheral surface of the port 208. The first inner peripheral inclined surface 232 and the second inner peripheral inclined surface 234 respectively form a first angle and a second angle with respect to the second axial direction A2, and the first angle is smaller than the second angle. The first angle may range from, for example, 5° to 15°. By guiding the sealing member 228 of the valve core 210 into the port 208 along the two successively arranged inner peripheral inclined surfaces inclination angles of which with respect to the second axial direction A2 decrease in turn, the elastic force, provided by the elastic member 212 and required for the valve core 210 to move from the second open position to the second closed position for blocking the port 208, may be reduced. Since the elastic member 212 only needs to provide a small elastic force, the service life of the elastic member 212 can be prolonged, thereby improving the service life of the male connector 200. Besides, this arrangement allows the use of an elastic member 212 with a lower elastic modulus, making installation of the mounting ring 222 easier when the male connector 200 is assembled. In addition, the second inner peripheral inclined surface 234 may also abut against the bracket 226 of the valve core 210 to limit the valve core 210 in the second closed position.

Figure 14:
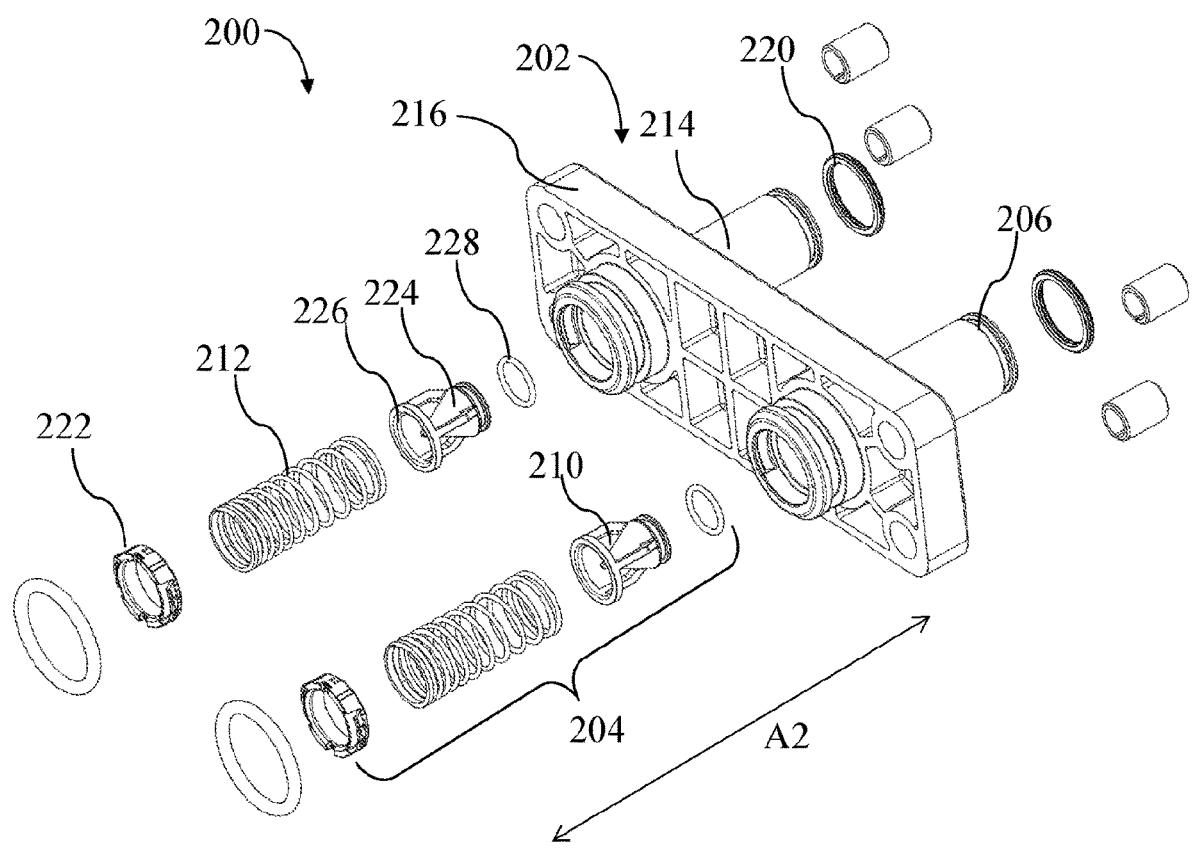
FIG. 14 is a schematic exploded view of the male connector according to the exemplary embodiment of the present application.

Referring to FIG. 14, in the illustrated embodiment, the casing 202 of the male connector 200 may include two casing bodies 214, and the male connector 200 may accordingly include two valve units 204. It is conceivable that the casing 202 of the male connector 200 may accordingly include one or more than two casing bodies 214, and the male connector 200 may include a corresponding number of valve units 204.

Referring to FIG. 2, when the male connector 200 is connected with the female connector 100, the plug end 206 of the male connector 200 is inserted into the female connector 100 via the opening 112 of the female connector 100 and pushes the sliding sleeve 138 of the female connector 100 away from the first closed position to the first open position, and at the same time, the valve stem head 142 of the female connector 100 pushes the valve core 210 of the male connector 200 away from the second closed position to the second open position, so that the flow paths of the female connector 100 and the male connector 200 are both opened and in fluid communication with each other, thereby establishing fluid communication between the fluid pipelines respectively connected to the female connector 100 and the male connector 200.

When the male connector 200 is disconnected from the female connector 100 by pulling the plug end 206 of the male connector 200 out of the female connector 100, the sliding sleeve 138 of the female connector 100 and the valve core 210 of the male connector 200 respectively return to the first closed position and the second closed position, and at this time, the flow paths of the female connector 100 and the male connector 200 are both closed, and the fluid in the fluid pipelines respectively connected to the female connector 100 and the male connector 200 will not leak.

The tolerance absorption function of the female connector 100 will be described below with reference to FIGS. 1 to 16, taking the application of the connector assembly 10 to establish fluid communication between a thermal management system in a battery pack and a coolant supply system in a vehicle as an example.

The female connector 100 of the connector assembly 10 may be fixed to the vehicle body and be in fluid communication with fluid pipelines in the coolant supply system of the vehicle. The male connector 200 may be fixed to the battery pack and be in fluid communication with fluid pipelines in the thermal management system of the battery pack.

For the female connector 100 and the male connector 200 in the illustrated embodiment, two fluid passages will be formed after the male connector 200 is connected with the female connector 100, where the coolant in the thermal management system of the battery pack, that has exchanged heat with the battery, can enter the coolant supply system of the vehicle through one fluid passage, and the low-temperature coolant in the coolant supply system can be replenished to the thermal management system of the battery pack through the other fluid passage.

When the battery pack is replaced, the male connector 200 on the battery pack is preliminarily aligned with the female connector 100 on the vehicle body, and then the plug end 206 of the male connector 200 is inserted into housing 102 of the female connector 100 through the opening 112 of the female connector 100.

During the connection of the male connector 200 on the battery pack with the female connector 100 on the vehicle body, if the male connector 200 is inserted into the female connector 100 in a correct insertion direction (that is, the first axial direction A1 of the female connector 100 is parallel to the second axial direction A2 of the male connector 200) but the plug end 206 of the male connector 200 is not completely aligned with the opening 112 of the female connector 100, the plug end 206 of the male connector 200 can still be inserted into the housing 102 via the opening 112 having the guide surface 126. And since the bushing 108 for holding the housing 102 can be elastically deformed and a movement space S that allows the first limiting member 114 to move therein is defined between the axial end 118 of the base 106 and the mounting member 110, the housing 102 within the bushing 108 can be shifted in synchronization with the casing body 214 of the male connector 200 to complete the connection of the male connector 200 with the female connector 100. After the battery pack is mounted and fixed in place on the vehicle, the male connector 200 will return to its preset correct position. Accordingly, the housing 102 will synchronously return to its preset correct position. In this way, the male connector 200 and the housing 102 of the female connector 100 are both returned to their preset correct positions.

Further, during the connection of the male connector 200 on the battery pack with the female connector 100 on the vehicle body, if the male connector 200 is not inserted in the correct direction but is obliquely inserted toward the female connector 100 (that is, the first axial direction A1 of the female connector 100 is angled with respect to the second axial direction A2 of the male connector 200), the plug end 206 of the male connector 200 can still be inserted into the housing 102 via the opening 112 having the guide surface 126. And due to the elastically deformable bushing 108 and existence of the movement space S that allows the first limiting member 114 to move therein, the housing 102 within the bushing 108 can be deflected following the casing body 214 of the male connector 200 (the first limiting member 114 can be deflected in the movement space S), to complete the connection of the male connector 200 with the female connector 100. After the battery pack is mounted and fixed in place on the vehicle, the male connector 200 will return to its preset right position. Accordingly, the housing 102 will synchronously return to its preset right position. In this way, the male connector 200 and the housing 102 of the female connector 100 are both returned to their preset right positions.

Therefore, the female connector 100 and the connector assembly 10 according to the present application can absorb the installation tolerances in various directions when the female connector 100 is connected with the male connector 200. It is conceivable that the female connector 100 and the connector assembly 10 according to the present application can be applied to various scenarios where a fluid communication needs to be established.

It should be understood that the embodiments shown in FIGS. 1 to 16 only illustrate the shape, size and arrangement of each optional component of the female connector and the connector assembly according to the present application. However, these embodiments are merely intended to illustrate, rather than limit. Other shapes, sizes and arrangements may be adopted without departing from the idea and scope of the present application.

The technical contents and technical features of the present application have been disclosed above. However, it can be understood that, those skilled in the art can make various changes and improvements to the above-disclosed concept under the creative concept of the present application, and all these various changes and improvements still fall within the protection scope of the present application. The description of the foregoing embodiments is illustrative rather than restrictive, and the protection scope of the present application is determined by the appended claims.

The invention claimed is:

1. A female connector comprising:
 a housing defining a first axial direction and having an opening at a first end of the housing for insertion of a male connector, an outer periphery of the housing being provided with a first limiting member;
 a valve assembly arranged in the housing;
 a base defining a receiving passage extending along the first axial direction, the housing being partially received in the receiving passage;
 a bushing sleeved outside the housing and arranged in the receiving passage, the bushing being elastically deformable; and
 a mounting member fixed to an axial end of the base,
 wherein the first limiting member is confined in the first axial direction between the axial end and the mounting member, and a movement space for the first limiting member to move therein is defined between the axial end and the mounting member.

2. The female connector according to claim 1, wherein a recess is provided at the axial end of the base to define the movement space together with the mounting member, and the recess is adjacent to and communicated with the receiving passage in the first axial direction.

3. The female connector according to claim 1, wherein the outer periphery of the housing is provided with a second limiting member, and the first limiting member and the second limiting member are spaced apart in the first axial direction, and wherein the bushing is sleeved on a part of the housing located between the first limiting member and the second limiting member, and the bushing has a length smaller than a distance between the first limiting member and the second limiting member in the first axial direction.

4. The female connector according to claim 3, wherein the first limiting member and the second limiting member are shaped and/or sized such that: the second limiting member is insertable through the receiving passage, and the first limiting member is stopped outside the receiving passage.

5. The female connector according to claim 1, wherein the bushing is made of thermoplastic elastomer or rubber material, and a peripheral wall of the bushing defines at least one cavity therein.

6. The female connector according to claim 1, wherein the bushing has a slit extending in the first axial direction and the housing is nested in the bushing via the slit.

7. The female connector according to claim 1, wherein the mounting member is in the form of a plate and extends substantially perpendicular to the first axial direction.

8. The female connector according to claim 1, wherein the opening of the housing has a guide surface for guiding the insertion of the male connector into the housing.

9. The female connector according to claim 1, wherein the housing comprises a first housing portion and a second housing portion which are assembled together, and wherein the first housing portion defines the first axial direction and the opening, and the second housing portion comprises an adapter section for being connected with a fluid pipeline.

10. The female connector according to claim 9, wherein the valve assembly comprises:
 a valve stem positioned in the housing along the first axial direction, the valve stem comprising a valve stem head and a valve stem base at two ends of the valve stem respectively;
 a sliding sleeve arranged in the first housing portion and sleeved outside the valve stem, the sliding sleeve being slidable between a first closed position and a first open position along the first axial direction; and
 an elastic element,
 wherein two ends of the elastic element respectively abut against the sliding sleeve and the valve stem base to bias the sliding sleeve toward the first closed position;
 wherein the sliding sleeve blocks an annular gap between the first housing portion and the valve stem head to cut off a flow path of the female connector when the sliding sleeve is in the first closed position, and the flow path of the female connector is opened when the sliding sleeve is in the first open position.

11. The female connector according to claim 10, wherein the second housing portion is coupled to the first housing portion and comprises an inner stepped portion,
 wherein the valve stem base is at least partially sandwiched between an end of the first housing portion away from the opening and the inner stepped portion of the second housing portion.

12. The female connector according to claim 10, wherein an outer periphery of the sliding sleeve is provided with a limiting protrusion, and an inner periphery of the first housing portion is provided with a limiting surface, wherein the limiting protrusion and the limiting surface are adapted to abut against each other to limit the sliding sleeve in the first closed position.

13. The female connector according to claim 10, wherein the sliding sleeve comprises a sealing member embedded in an outer periphery of the sliding sleeve for sealing contact with an inner peripheral surface of the first housing portion, wherein the sealing member is in the form of an irregular sealing ring, and an inner periphery of the sealing member has two annular flanges arranged along the first axial direction, and wherein each annular flange tapers inwardly in a radial direction.

14. A connector assembly comprising a female connector according to claim 1 and a male connector for being connected with the female connector, wherein the male connector comprises:
 a casing defining a second axial direction and having a plug end in the second axial direction, the plug end defining a port; and
 a valve unit arranged in the casing and comprising a valve core and an elastic member, the valve core being movable in the second axial direction between a second closed position and a second open position, the valve core being biased toward the second closed position by the elastic member;
 wherein the valve core blocks the port to cut off a flow path of the male connector when the valve core is in the second closed position, and the flow path of the male connector is opened when the valve core is in the second open position;
 wherein the female connector and the male connector interact with each other when connected with each other, such that the flow path of the female connector and the flow path of the male connector are both opened and in fluid communication with each other.

15. The connector assembly according to claim 14, wherein the plug end defines a first inner peripheral inclined surface and a second inner peripheral inclined surface, wherein an inner peripheral surface of the port, the first inner peripheral inclined surface, and the second inner peripheral inclined surface are sequentially connected in the second axial direction, and the first inner peripheral inclined surface and the second inner peripheral inclined surface are configured to guide a sealing member embedded in an outer periphery of the valve core to move in the second axial direction into sealing contact with an inner peripheral surface of the port, wherein the first inner peripheral inclined surface and the second inner peripheral inclined surface respectively form a first angle and a second angle with respect to the second axial direction, and the first angle is smaller than the second angle.

16. The connector assembly according to claim 15, wherein the first angle ranges from 5° to 15°.

17. The connector assembly according to claim 14, wherein the plug end comprises a sealing member embedded in an outer periphery of the plug end for sealing contact with an inner peripheral surface of a housing of the female connector, wherein the sealing member is in the form of an irregular sealing ring, and an inner periphery of the sealing member has two annular flanges arranged along the second axial direction, and wherein each annular flange tapers inwardly in a radial direction.

* * * * *